(12) United States Patent
Ehrenschwender et al.

(10) Patent No.: US 10,372,940 B2
(45) Date of Patent: Aug. 6, 2019

(54) METHOD AND DEVICE FOR THE PSEUDONYMIZATION OF DIGITAL DATA

(75) Inventors: Dieter Ehrenschwender, Lonnerstadt (DE); Gerhard Henkel, Siegburg (DE); Stefan Kalck, Eisenach (DE); Heiko Kern, Griesheim (DE)

(73) Assignee: DEUTSCHE TELEKOM AG, Bonn (DE)

( * ) Notice: Subject to any disclaimer, the term of this patent is extended or adjusted under 35 U.S.C. 154(b) by 2529 days.

(21) Appl. No.: 12/293,203

(22) PCT Filed: Mar. 14, 2007

(86) PCT No.: PCT/DE2007/000452
§ 371 (c)(1),
(2), (4) Date: Feb. 26, 2009

(87) PCT Pub. No.: WO2007/110035
PCT Pub. Date: Oct. 4, 2007

(65) Prior Publication Data
US 2009/0265788 A1   Oct. 22, 2009

(30) Foreign Application Priority Data
Mar. 17, 2006 (DE) .......................... 10 2006 012 311

(51) Int. Cl.
*G06F 21/62* (2013.01)

(52) U.S. Cl.
CPC ................................ *G06F 21/6254* (2013.01)

(58) Field of Classification Search
CPC ................................................. G06F 21/6254
(Continued)

(56) References Cited

U.S. PATENT DOCUMENTS

| | | | | |
|---|---|---|---|---|
| 4,999,766 A | * | 3/1991 | Peters et al. | |
| 5,841,865 A | * | 11/1998 | Sudia | 380/286 |

(Continued)

FOREIGN PATENT DOCUMENTS

| | | |
|---|---|---|
| DE | 10327291 | 2/2005 |
| DE | 102004038038 | 12/2005 |

(Continued)

OTHER PUBLICATIONS

Van der Haak et al., Data security and protection in cross-institutional electronic patient records, [online], International Journal of Medical Informatics, Jul. 2003, vol. 70, p. 117-130 [retrieved on Mar. 19, 2019]. Retrieved from the Internet: <URL:https://doi.org/10.1016/S1386-5056(03)00033-9> (Year: 2003).*

(Continued)

*Primary Examiner* — Peter H Choi
*Assistant Examiner* — Monica A Mandel
(74) *Attorney, Agent, or Firm* — Leydig, Voit & Mayer, Ltd.

(57) ABSTRACT

A system and method for pseudonymizing digital data records sent from a source system to a destination system, using an identity protector client system and an identity protector master system, includes the steps of receiving, at the identity protector client, person-specific data from a source system provided with a source identifier. The digital data records are pre-pseudonymized by the identity protector client, and the processed digital data records are marked with a source identifier which references the source file in the source system. The pre-pseudonymized digital data records are transmitted to the identity protector master. For every data record, a pseudonym is created by the identity protector master from the pre-pseudonym, the source identifier, and at least one other value generated from an erratic (Continued)

value and a time value. The pseudonym is transmitted to the destination system.

11 Claims, 6 Drawing Sheets

(58) Field of Classification Search
USPC .......................................................... 726/26
See application file for complete search history.

(56) References Cited

U.S. PATENT DOCUMENTS

| | | | |
|---|---|---|---|
| 6,430,608 B1* | 8/2002 | Shaio | 709/217 |
| 6,484,182 B1* | 11/2002 | Dunphy et al. | 700/231 |
| 6,961,858 B2* | 11/2005 | Fransdonk | 726/29 |
| 7,020,635 B2* | 3/2006 | Hamilton et al. | 705/51 |
| 7,080,049 B2* | 7/2006 | Truitt et al. | 705/75 |
| 7,090,128 B2* | 8/2006 | Farley et al. | 235/384 |
| 7,107,462 B2* | 9/2006 | Fransdonk | 713/193 |
| 7,150,045 B2* | 12/2006 | Koelle et al. | 726/26 |
| 7,587,502 B2* | 9/2009 | Crawford et al. | 709/229 |
| 7,711,586 B2* | 5/2010 | Aggarwal et al. | 705/5 |
| 2002/0073138 A1 | 6/2002 | Gilbert et al. | |
| 2002/0169793 A1 | 11/2002 | Sweeney | |
| 2004/0199781 A1 | 10/2004 | Erickson et al. | |
| 2004/0215981 A1* | 10/2004 | Ricciardi et al. | 713/202 |
| 2005/0043964 A1* | 2/2005 | Thielscher et al. | 705/2 |
| 2005/0283621 A1 | 12/2005 | Sato et al. | |
| 2006/0031301 A1 | 2/2006 | Herz et al. | |

FOREIGN PATENT DOCUMENTS

| | | |
|---|---|---|
| EP | 1416419 | 5/2004 |
| WO | WO-0118831 | 3/2001 |
| WO | WO-2005109294 | 11/2005 |
| WO | WO-05117481 | 12/2005 |

OTHER PUBLICATIONS

"Bundesdatenschutzgesetz (BDSG)", [German Federal Data Protection Act] (Simitis), paragraph 3, section 6a, Dec. 20, 1990.
Commentary of "Bundesdatenschutzgesetz (BDSG)", [German Federal Data Protection Act] (Simitis), pp. 274-280.

* cited by examiner

METHOD AND DEVICE FOR THE PSEUDONYMIZATION OF DIGITAL DATA

CLAIM OF PRIORITY

This application is a U.S. national phase application under 35 U.S.C. § 371 of International Patent Application No. PCT/DE2007/000452 filed Mar. 14, 2007, which claims the benefit of priority to German Patent Application No. 10 2006 012 311.5 filed Mar. 17, 2006. The International Application was published in the German language on Oct. 4, 2007 as WO 2007/110035 A1.

FIELD

The present invention relates to a method and a device for pseudonymizing digital data records from a source system that are directed to a destination system.

BACKGROUND

Pseudonymization is a process of modifying person-specific (i.e., personal) data by using an assignment rule in such a way that the individual data pertaining to personal or material circumstances can no longer be attributed to an individual person without knowledge or use of the assignment rule.

To that end, for example, the identification data are converted by a mapping instruction into an arbitrarily selected identifier (the pseudonym).

The aim of such a method is to enable the link to the person to be re-established only if needed and if previously defined boundary conditions are met.

Under § 3, section 6a BDSG [German Federal Data Protection Act], pseudonymized data are data that are linkable to a person, because, by definition, an assignment between the pseudonym and the name of the person should be possible, in principle. Conversely, however, under § 3, section 6a BDSG, the pseudonymization is intended to virtually exclude or at least hinder a random re-identification. Thus—apart from the existence of an assignment function—the pseudonymization must achieve the quality of effectively anonymized data for third parties. To this end, suitable mathematical methods are employed, including the filling of data records, to effectively prevent the re-identification thereof.

There are also cases where solely the concerned person can remain excluded from the re-identification. Note regarding definition and delimitation "pseudonymization" and "anonymization:" compare excerpt (pp. 274 through 280) from the commentary on the German Federal Data Protection Act (Simitis).

SUMMARY

In an embodiment the present invention provides a method for pseudonymizing digital data records sent from a source system to a destination system, using an identity protector client system and an identity protector master system. The method includes the steps of receiving, at the identity protector client, person-specific data from a source system provided with a source identifier; pre-pseudonymizing the digital data records, by the identity protector client, and marking the processed digital data records with a source identifier which references the source file in the source system; transmitting the pre-pseudonymized digital data records to the identity protector master; for every data record, creating, by the identity protector master, a pseudonym from the pre-pseudonym, the source identifier, and at least one other value; generated from an erratic value and a time value; and transmitting the pseudonym to the destination system.

DETAILED DESCRIPTION

Figure 1:
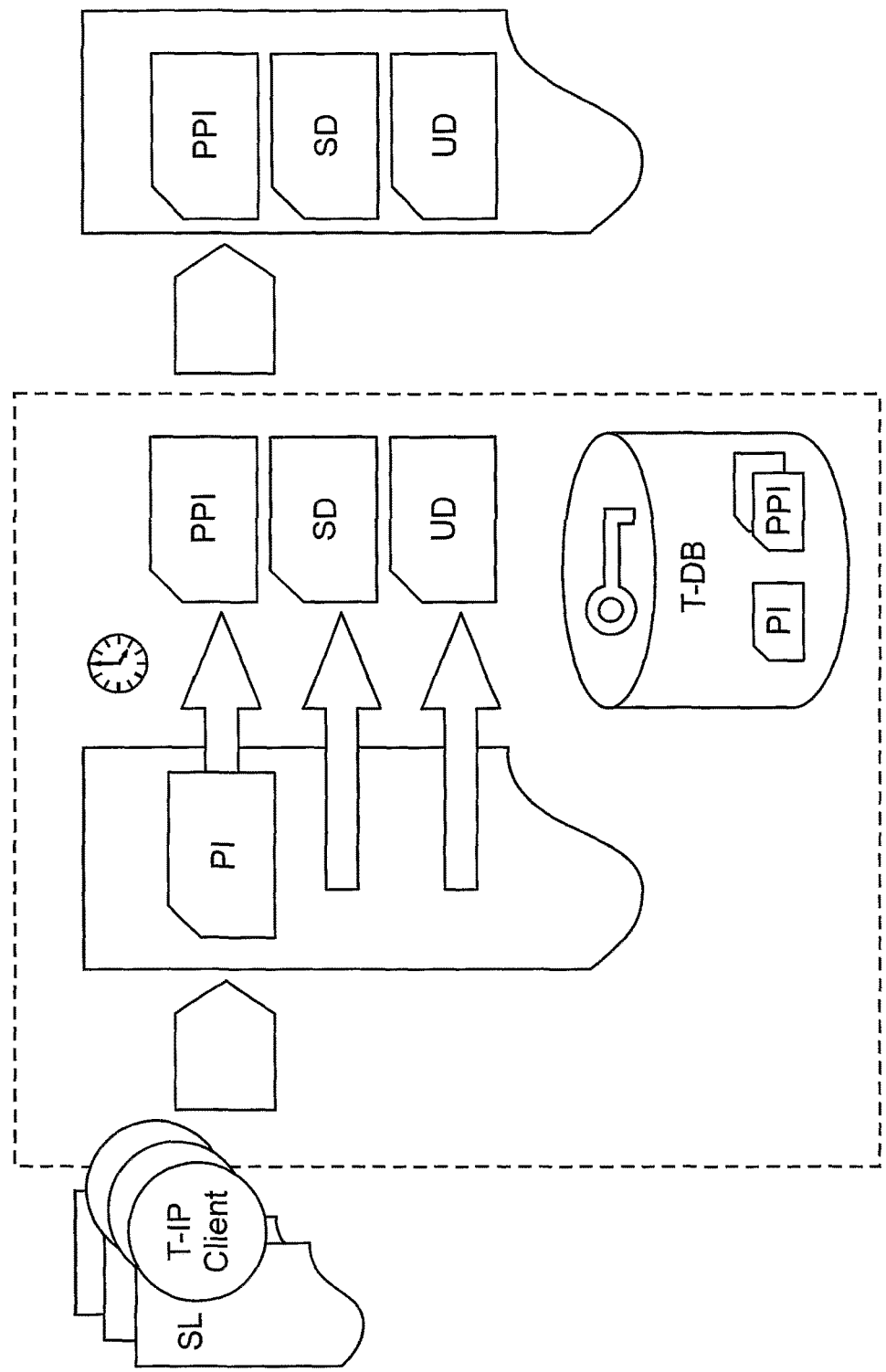
FIG. 1 illustrates components of an embodiment in accordance with the present invention, including: source list (SL), T-IP client, master IP, the personal identifier (PI) from which the pseudonymous personal identifier (PPI) is generated and is transmitted along with statistical data (SD) and uncritical data (UD), and the trusted database (T-DB), respectively, the source.

The analysis of corporate employee data constitutes one possible first application example. Thus, for example, a companywide search is planned for employees having a specific qualification profile for a foreign assignment. The legal problem inherent in this situation is that the employment relationships typically reside only with the particular legal person, not however with the whole corporation. Therefore, for lack of a contractual legal basis, it is only permissible to transfer employee data to other employers with the consent of the concerned person. To avoid data protection problems, the concept provides for a first search for individuals having a required qualification profile to be initially conducted only via the pseudonymized data records. A re-identification would only be subsequently required for the ascertained staff members, to be able to address them directly. In this case, the legal requirements relating to the re-identification are then to be observed.

A second application example relates to managing the billing data of the users of a telecommunications or online service. The billing data are to be managed in pseudonymized form and only re-identified in order to collect the invoiced amount, respectively to transmit the invoice to the customer.

Another example relates to the outsourcing of the processing of person-specific data to a data processor having an office abroad, particularly in a non-EU member country that does not have a level of protection comparable to that of the European Union. In this case, the pseudonymization, respectively re-identification would be carried out exclusively by the domestic contracting entity, while the billing processes of the contractor would be limited merely to the processing of pseudonymized data.

Embodiments of the present invention can allow a processing of person-specific data by utilizing the computing capacity currently available at various locations. Particularly for statistically analyzing data relating to a specific individual from various source systems, using identification numbers. Moreover, it is intended that embodiments of the present invention also make possible a re-identification under controlled conditions.

An embodiment of the present invention makes it possible for qualitative statements to be made about data records from different systems, but, at the same time, also for the legitimate interests of the concerned persons to be protected in a manner that economizes on data, also in conformance with any existing laws. The pseudonymization model makes analyses possible that would otherwise be prohibited under data protection laws for person-specific individual data. At the same time, however, an embodiment also makes it possible to re-identify the data records, however, under controlled and thus predefined requirements.

An embodiment of the present invention contributes to data protection compliance, in that the data are protected by the pseudonymization from an unauthorized use. In this manner, a central role is assigned to the data protection management, as it protects customer or employee data from unauthorized access and processing and thus meets an important condition for acceptance of the processing by the concerned persons.

To aid in understanding the present invention, the following areas are differentiated:

The source of the data (source list) from which the person-specific data are obtained. For example, the employee data of a corporate affiliate or the customer data of an invoicing system may reside in the source system.

The recipient (destination system), which typically receives the data in an anonymized form, but, under "controlled and defined conditions," may also obtain these data in a pseudonymized form for purposes of a later re-identification.

The T-IP (T-Identity Protector), in which the pseudonymization is performed or canceled in accordance with the "concept of knowledge distributed among different roles." Within the T-IP system, the processing of the data is distributed among different roles. These roles, respectively components, are discussed further below, the two-step process of pseudonymization, as described in the claims, being an important aspect.

The pre-pseudonymization is carried out as the responsibility of the source system by a pseudonymization box, respectively pseudonymization system (T-IP client) provided by the T-IP. The T-IP client preferably resides in the area of responsibility of the location responsible for the source system. The main or principal pseudonymization is then carried out in the T-IP master.

The recipient of the destination system must clarify the conditions under which it is allowed to receive pseudonymized data in place of anonymized data, and the degree of pseudonymization that is to be required.

On the other hand, the conditions under which a re-identification is permissible, are important.

The conditions under which a re-identification is considered permissible, depend on the particular context of the use.

The T-IP assumes the pseudonymization task using a model which is based on a knowledge that is distributed in accordance with different roles and whose essential features are summarized in the following.

The principle of distributing the knowledge among different roles is intended to make an effective pseudonymization possible and prevent an uncontrolled re-identification. To this end, the knowledge required for the pseudonymization, as well as the knowledge required for the re-identification are distributed among different roles. The information flow among these roles is regulated using technology in order to prevent an irregular re-identification (i.e., a re-identification that is against the rules). The security of the process may be enhanced by assigning individual roles to third parties outside of the location responsible for the T-IP.

In this context, the T-IP preferably takes on the following tasks: the pseudonymization, the recognizing of fault data, the encrypted transmission of the data to a recipient on the condition of a reliable authentification, the retaining of pseudonymized data for analysis purposes, the statistical analysis of pseudonymized data, the generating, managing and erasing of information for pseudonymization and for re-identification, and the supporting of the re-identification.

In its preferred specific embodiment, the T-IP is composed of the following components: the T-IP client, the T-IP master, the T-IP trusted database (T-DB) and the trust center.

The T-IP client resides in the area of responsibility of the source system, so that neither the operator of the T-IP master, respectively the T-DB, nor the destination system has access to the pre-pseudonymization carried out in the T-IP client. However, the technical functionality of the T-IP client is an integral part of the service of the T-IP.

The processing of the pseudonymized data records, but not the management of the pseudonyms, takes place in the T-IP master.

The T-DB manages the pseudonyms and their identifiers in cooperation with the trust center. However, the data records are processed by the T-DB, with the exception of the source ID of the data records.

Without the trust center, a re-identification of the pseudonymized data cannot be initiated. Therefore, it is not permitted for its role to be taken over by the operator of the T-IP Master, respectively of the T-DB.

The functional sequence of the pseudonymization takes place in accordance with the following scheme.

The T-IP client receives person-specific data from a source system provided with a source ID. From the name, birth date, and other unique identifiers, it generates a pre-pseudonym (PI) with the aid of a protected hash function and transmits the PI to the source system. In addition, possible identifiers, such as birth date or zip code, may be reduced to categories, such as birth year or zip code area, that ire required for analysis.

The thus prepared data record is provided with a source ID which references the source file in the source system, and preferably with a test value to ensure the integrity of the data.

These pre-pseudonymized data records are transmitted to the T-IP master. The T-IP client then erases the person-specific data received from the source system.

The T-IP client resides in the area of responsibility of the source system. It is made available to the location of the T-IP responsible for the source system, solely for the purpose of the pseudonymization. The pseudonymization takes place in a type of black box.

Upon completion of the pseudonymization, the source system has the output data, the source ID, as well as the PI available to it, while all data are erased in the T-IP client following transmission of the pre-pseudonymized data. From the source system with the support of the T-IP client, the T-IP master receives the data record that is pre-pseudonymized with the PI, as well as the source ID, which references the database of the source system.

The T-IP master receives pre-pseudonymized data records generated by T-IP client for this request.

For each data record, it then creates a pseudonym (PPI) which is generated from the pre-pseudonym (PI) and the source ID, and preferably from an erratic value (salt) and a time value; preferably sets up statistical categories (SD) from critical person-specific data; preferably modifies the data fields, thereby making possible a re-identification in combination with other information; and transmits them as uncritical data (UD) to the destination system.

Moreover, it is standard practice for the respective data records to be transmitted without pseudonym (PPI) to the destination system, data records being transferred with pseudonym (PPI) to the destination system only in response to a special prompt. In this case, for purposes of a later re-identification, the information is transmitted to the T-DB from the fields PPI, source ID, PI and time value.

Upon completion of the pseudonymization, the data are erased.

For standard analyses, only anonymized data records (without PPI) are delivered to the destination system. If the intention is for the data records to be able to be re-identified following such an analysis, the data records are then transmitted along with pseudonyms (PPI) to the destination system.

As a result of the double pseudonymization, which includes the pre-pseudonymization in the T-IP client under the responsibility of the source system, the subsequent pseudonymization in the T-IP master, as well as the management of the pseudonyms in the T-DB, an uncontrolled re-identification is prevented in the destination system.

The destination system may, in fact, assign the PPI to the pre-pseudonym PI in cooperation with the T-DB, but the latter may re-identify PI via the source ID only in cooperation with the source system.

A re-identification may also not be carried out by a cooperation between the destination system and the T-IP master, as the latter does not have any more stored data upon completion of the pseudonymization.

Thus, a re-identification is only possible with the aid of the information from the respective source system. However, it bears the responsibility toward the concerned person when it uncovers the pseudonym and, as a result, initiates a transmission of person-specific data to the destination system in a process that requires justification.

Figure 2:
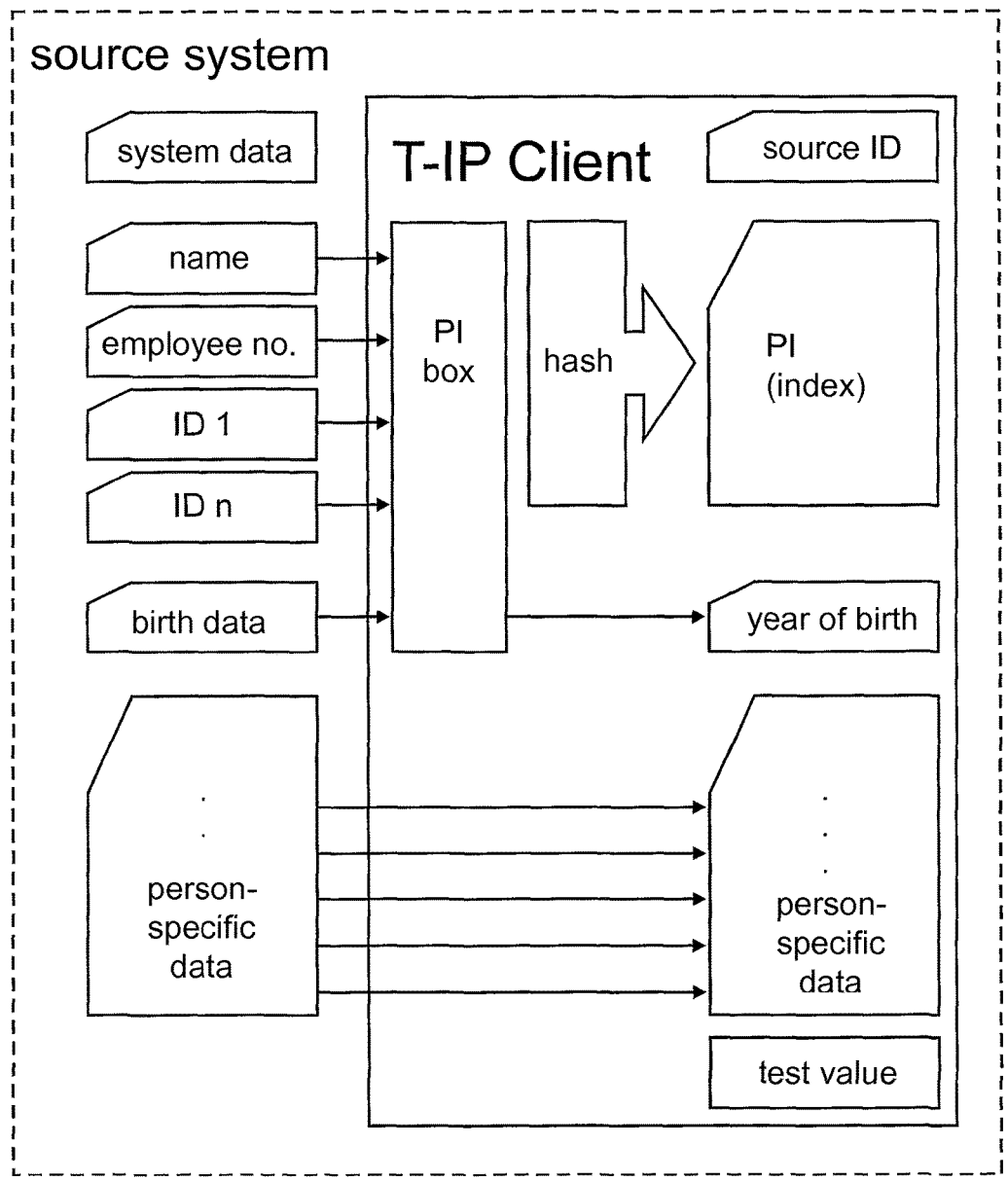
FIG. 2 illustrates an embodiment of the T-IP client in accordance with the present invention.
Figure 3:
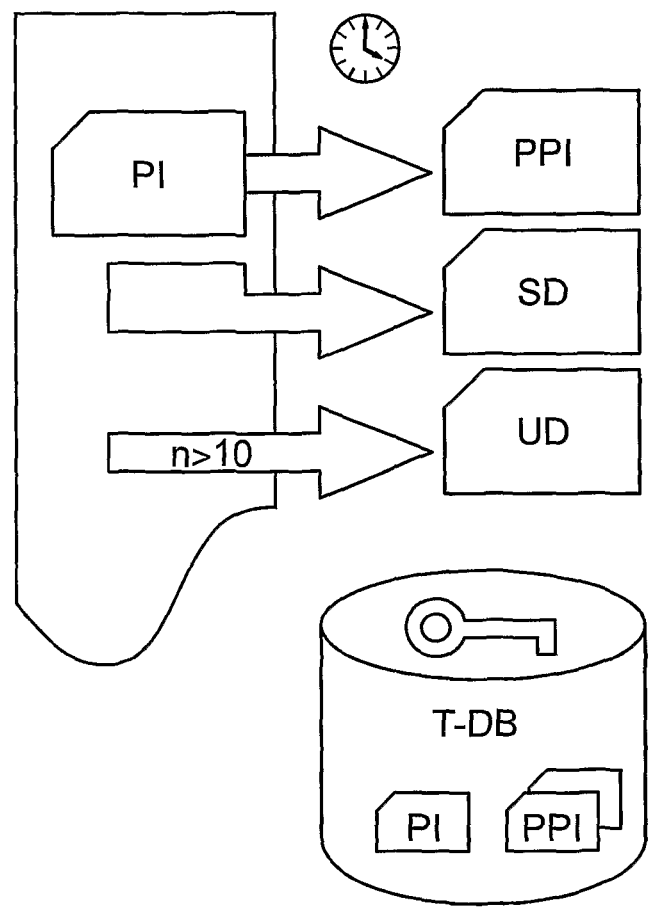
FIG. 3: illustrates an embodiment of the storage of the data in a T-DB in accordance with the present invention.
Figure 4:
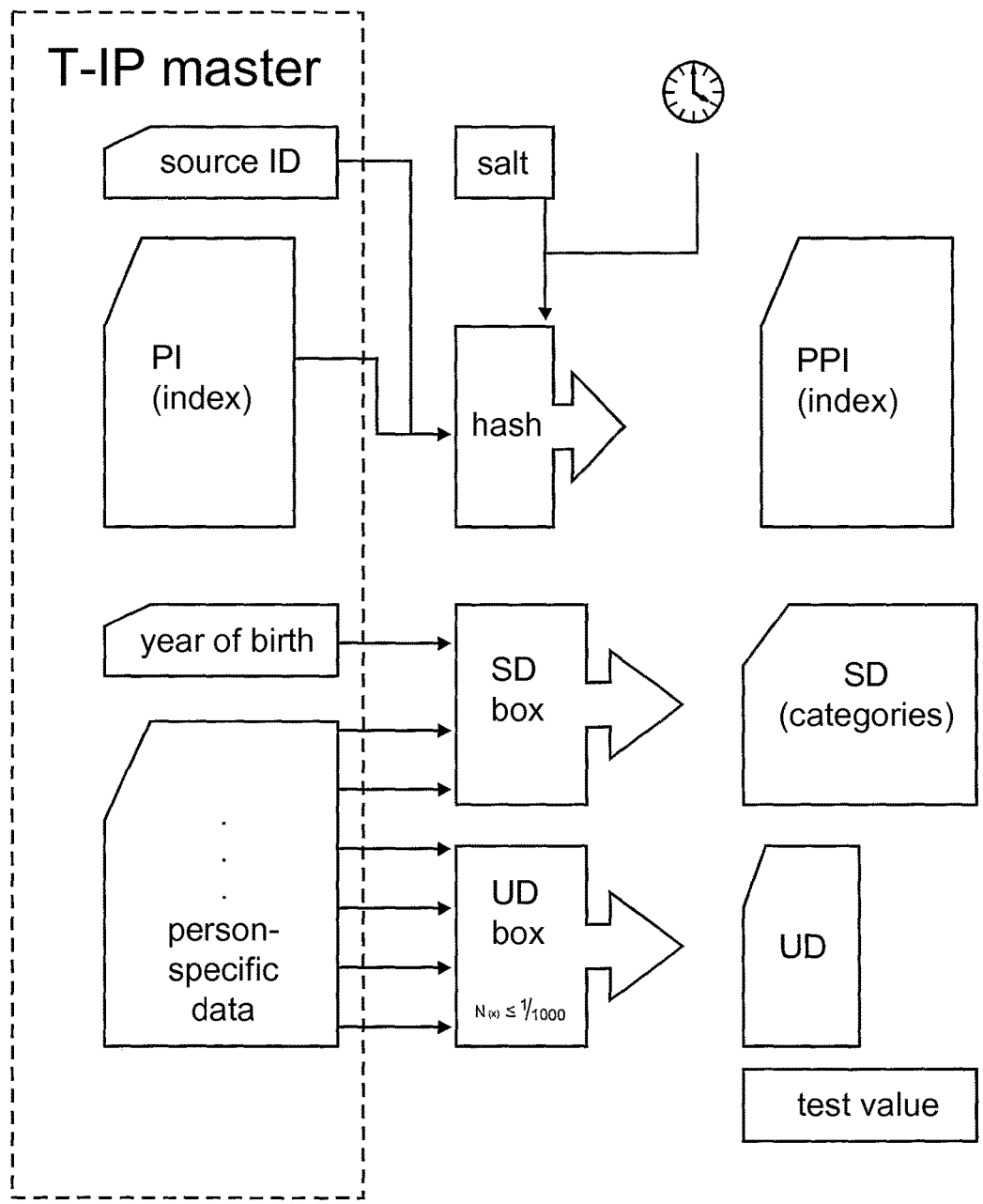
FIG. 4: illustrates an embodiment of the functional sequence in the T-IP master in accordance with the present invention.

The T-IP client illustrated in FIG. 1 and 2 processes person-specific data from source databases (source lists). The T-IP client has the task of processing person-specific data of the source system, of pseudonymizing the same, and then of encrypting the same in one preferred specific embodiment, and of transmitting it to the T-IP master which is shown in detail in FIG. 3 and 4.

The pre-pseudonymization takes place in a P box of the T-IP client which is made available to the source system by the T-IP system, but functions under the responsibility of the source system. Each source system has a P box. The legal responsibility for the pseudonymization and the transmission of the pre-pseudonymized data records (PI) resides with the location responsible for the source system.

A uniform pre-pseudonym PI may be generated on condition that a uniform data preparation take place in the source databases. A complex process is used to carry out the pre-pseudonymization in the P box, in order to prevent a re-identification within the T-IP or attacks on the transmission path from the T-IP client to the T-IP master. It is intended that the pre-pseudonymized data records be preferably relayed to the T-IP master in encrypted form. It is to be ensured that the data records are actually received by the addressed T-IP master and not by any third party (authentication with certificate).

As a basis for the pre-pseudonym, the name is used in conjunction with other identification features, such as birth date, place of birth, and other unique identifiers (employee number, customer number, inter alia). These identifiers are modified in the PI box of the T-IP client by an algorithm in such a way that the resulting character string does not make any sense to an attacker (without knowledge of a data record). The character string is subsequently converted by a hash function into the pre-pseudonym PI.

In the context of the pre-pseudonymization, person-specific data are to be already transmitted in data categories (for example, birth date ->birth year, zip code -> zip code area, etc.; see FIG. 2). The transmission in data categories is implemented during system installation (customizing), while taking into account the analysis requirements. This is intended to hinder a re-identification of the pre-pseudonymized data records. The method is employed only for (pre-) pseudonymizing the data records from the source systems before they are transmitted to the T-IP master (see FIG. 1 and FIG. 6). It is possible, however, that the thereby achieved pseudonymization quality is still insufficient for a transfer of the data records to the destination system.

Prior to the transmission to the T-IP master, the pre-pseudonymized data record is provided with a source ID and a test value. The source ID informs the T-DB about the source system from which a data record required for re-identification originates. The test value guarantees the integrity of the transmitted data record to the T-IP master.

To ensure that the data are highly informative, the included source systems should have a uniformly maintained data stock. Problems arise, for example, when date information or employee numbers are represented differently by the source systems. Only when such irregularities related to formatting are cleared is it possible for a double comparison to be made on the basis of the pre-pseudonyms (PI) from the source systems. The aim of this measure is to be able to assign data records of one person to the person as a statistical unit. However, for such a double comparison, the data records in question must be able to be buffer stored in the T-IP master in the pre-pseudonymized state. Since the source ID is used for generating the pseudonym (PPI) in the T-IP master, different pseudonyms PPI are generated from identical PI.

It is standard procedure for the data to be delivered from the T-IP master to a destination system without the corresponding pseudonyms. Thus, as a rule, the destination system only receives anonymized data. These data may also no longer be re-identified in the T-IP master since it does not keep these pseudonyms in reserve.

Figure 5:
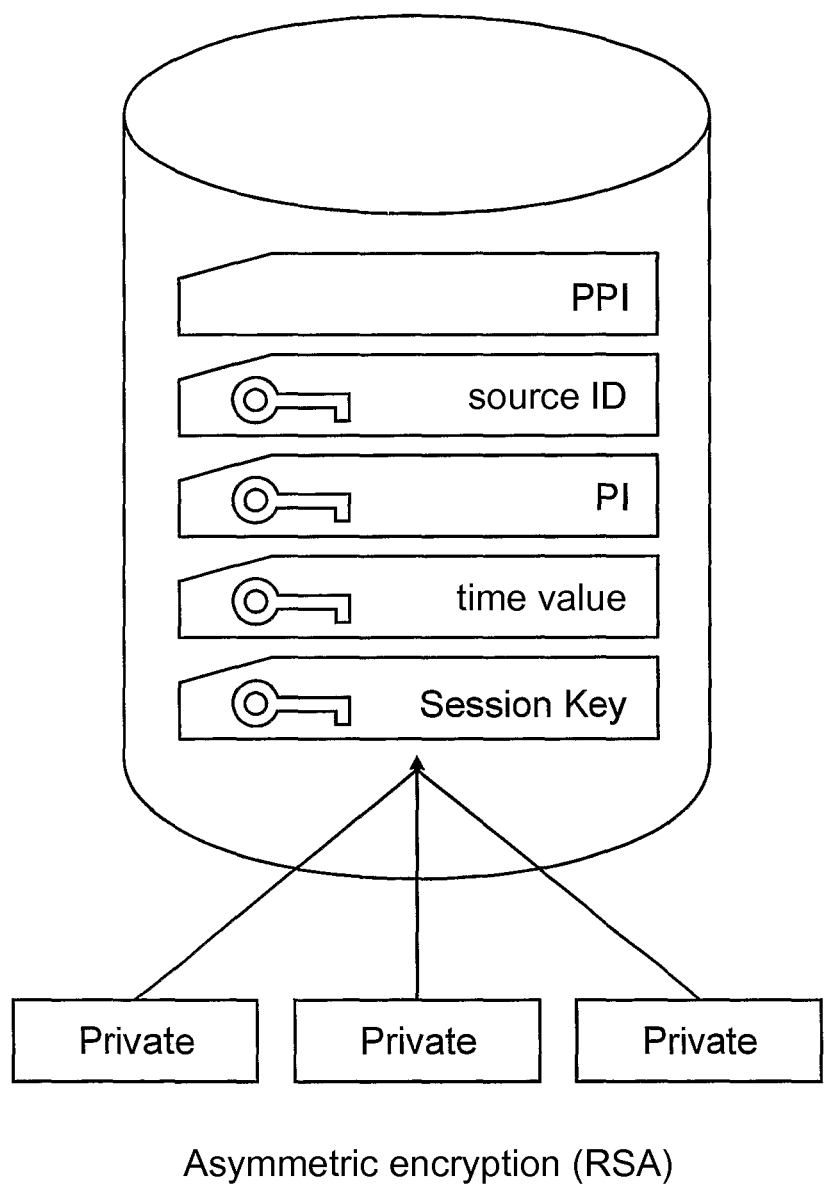
FIG. 5: illustrates an embodiment of the encrypted storage in the database in accordance with the present invention.

It is a different case when a destination system requests data records "with the possibility of later re-identification." Only in such a case are pseudonyms (PPI) generated in the T-IP master for each data record. To this end, the PPI is generated from the pre-pseudonym (PI) in permutation with a time stamp, an erratic value and the source ID, as well as by a hash function (see FIG. 4). The assignment of the PPI to the corresponding source ID and the PI is stored in the trusted database (T-DB) for a later re-identification (see FIG. 3, 5 and 6).

There is no need to additionally store the time value to generate the PPI from the PI in the T-DB, since it does not fulfill any function. It suffices to store a simple date entry to ensure that the assignment data records are deleted following a preset time limit. A plurality of PPI may be assigned to one PI, since, in response to each request for an analysis with the possibility of re-identification, a new PPI is generated from each PI.

Depending on the type of analysis and number of underlying data records, statistical categories (SD) are created in the T-IP master. This makes it possible to combine age groups or zip code areas, for example. However, the statistical data categories should not be too narrowly defined, since, otherwise, a re-identification would be possible. Thus a data category in terms of "length of employment with the firm in months," as well as a breakdown by age brackets into individual years already allow definite conclusions to be drawn about the person. Also, forming a statistical category, for example, by the group of "initial letters of the family name (A-C)" makes little sense for analyses and would undermine pseudonymization efforts. Only those data fields, which have virtually no link to the person and for which a sufficient number of data records are combined for each value, may remain unchanged as uncritical data (UD). If values of a data field have only a few entries, then this data field is characterized as not being suited for analysis.

The destination system must not be able to attribute the PPI to a person and thereby carry out a re-identification. To prevent a re-identification of statistical data (SD) in the data warehouse system of the destination system, the quantity of transmitted data must not become too large. In one preferred specific embodiment, a data protection manager assumes the task of controlling the type and quantity of transmitted data records. The data on the destination system are to be erased once a defined time limit has elapsed.

All data transmissions among the roles, respectively systems preferably take place in encrypted form. The systems which are communicating with one another must preferably be authenticated via a certificate.

When prompted by a destination system, the T-IP master requests data from the T-IP clients of the respective source systems for purposes of an analysis. The T-IP client must ascertain that the request is coming from the T-IP master. The T-IP client is permitted to transmit only pre-pseudonymized data, and only to the T-IP master.

A destination system requests data for analysis from the T-IP master. It is intended that the T-IP master only react to this request when it comes from an authorized destination system. The T-IP master transmits only anonymized, respectively pseudonymized data, and also only to the requesting destination system.

A further export of the data by the destination system to third parties is to be prevented.

Figure 6:
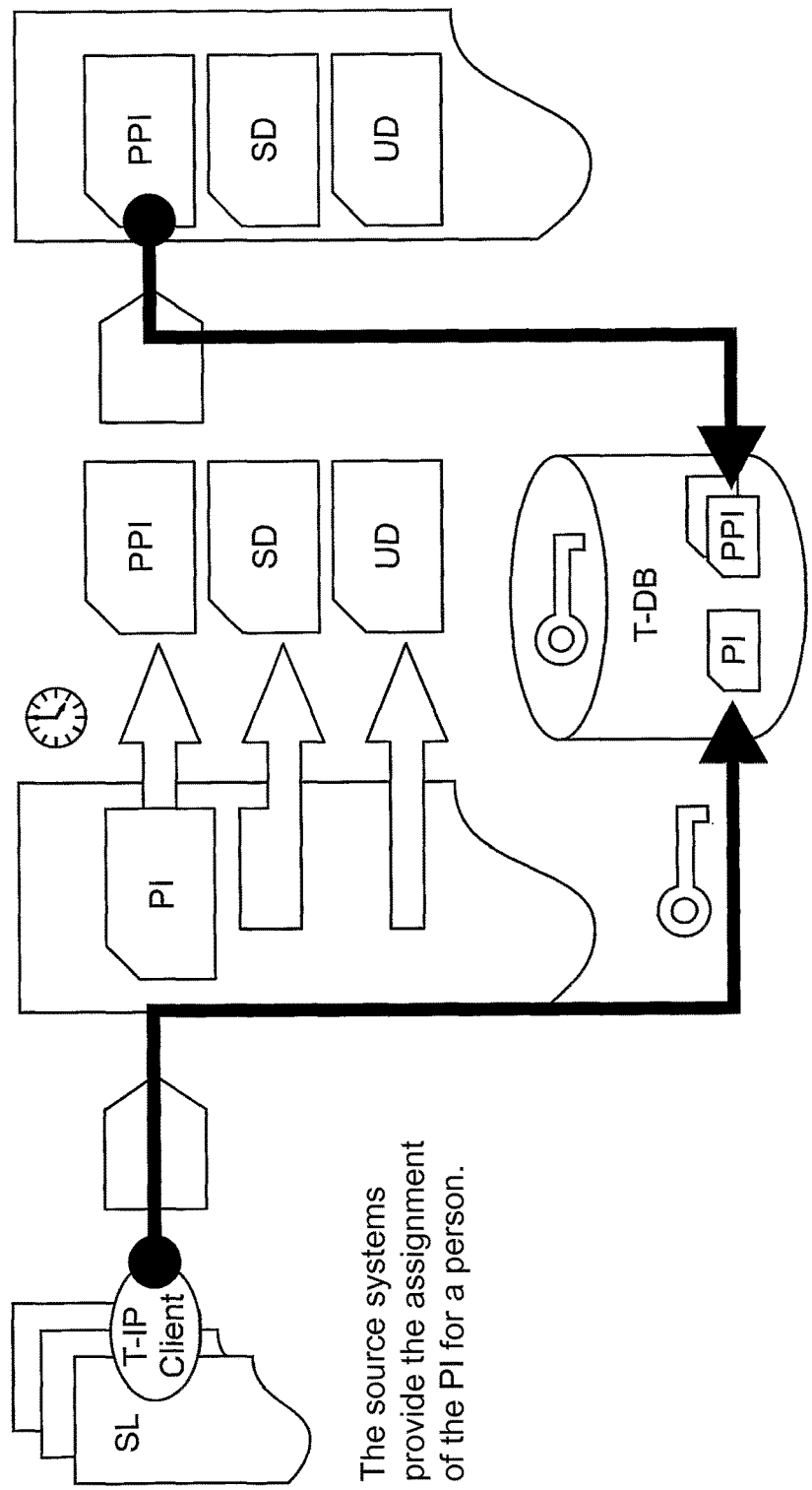
FIG. 6: illustrates an embodiment of the assignment of the person to a PI for the re-identification in accordance with the present invention.

A party responsible for a destination system requests the re-identification of selected PPI of a specific analysis from the trusted database (T-DB), while specifying the reasons (FIG. 6). The T-DB itself is not able to re-identify the PPI. It has only encrypted information (FIG. 5) available indicating the source system in which the particular data records are to be re-identified. A re-identification is preferably only possible with the aid of the trust center. Thus, it is the task of the trust center to check the reliability of the re-identification and to release the same.

Only after three trust entities of the trust center have made their key fragments available (see FIG. 5) may the private key of the trust center be generated in the T-DB in order to decrypt the session key. Only this session key permits the decryption of the assignment data (PPI-PI—source ID).

Not until after this procedure is the T-DB permitted to send the PI belonging to the PPI to the source system identified with the aid of the source ID. Only the source system is able to identify the person belonging to the PI because it has either stored the PI or, recalculates the PI of the data records in question via the T-IP client and matches it to the requested PI. The source system checks and decides whether it is allowed to disclose the identity of the person for the PI in question to the destination system.

It is intended that the T-IP master have an overview of which destination system is requesting which analyses and of how many data records have already been delivered to the destination system in question. A graphic representation of the control numbers should follow, making it possible for even a technical layperson to recognize and evaluate the quantity and quality of the data flows. All re-identification requests are logged.

A periodically recurring, i.e., daily, weekly and also monthly notification by e-mail about the type and number of requests and transmissions is advantageous. In addition, a service should be provided that lists and presents the transmission numbers of individual destination systems. To control the T-IP clients, an analysis follows of the protocols of the data sent from there (source, destination, time, action), to be able to track an error-free functioning of the T-IP clients.

The T-DB stores the assignment data (PPI, source ID, time value, PI) transmitted to it from the T-IP master, the three last mentioned fields being symmetrically encrypted (using a session key). The T-DB encrypts the session key asymmetrically using the public key of the trust center and subsequently stores it in the database. It divides the private key of the trust center upon generation of the same into a plurality of parts (multi-eye principle), delivers the partial keys to the corresponding number of trust entities and deletes it in its own system.

Thus, it renders possible a later assignment of PPI to PI and source ID when the three trust entities make their key parts available, and deletes the assignment data records (PPI, source ID, time value, PI) in accordance with a defined time period.

If the destination system would like to permit re-identification of a data record provided with a PPI, the T-DB may then merely assign the PPI to the corresponding PI and its source ID. The T-DB must subsequently direct the request for re-identifying the PI to the source system which requires the T-IP client in order to assign the PPI to the PI. However, the re-identification may only be initiated when the trust center makes all parts of the key available in order to encrypt the assignment of the PPI to the PI in the T-DB. An assignment of the PPI to the PI is only possible via the source system. Thus, the destination system may initiate a re-identification only when the T-DB, the trust center, as well as the source system cooperate. From the point of view of the concerned person, a re-identification of his/her pseudonymized data is only possible when the source system permits the same by disclosing the identity of the pseudonym to the trust center, respectively the destination system. This case corresponds to that of a transmission of the person-specific data to a third party.

The trust center (FIG. 6) secures the assignment of PPI to PI and the source ID since it is only by using its private key that the data record is able to be decrypted along with the assignment. The trust center protects against an unauthorized cooperation in that the private key is distributed by the T-DB over typically three trust entities (for example, workers' council, management, and data protection officer), so that it is only possible to decrypt the assignment of PPI to PI and the source ID when these trust entities combine their partial keys.

The trust center releases the assignment of PPI to PI and the source ID from the T-DB by decrypting the assignment data record.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for pseudonymizing digital data records for transmission from a source computing system to a destination computing system, the method comprising:
   receiving, by a client component of an identity protector system, person-specific data from a source computing system provided with a source identifier, wherein the person-specific data comprises unique identifiers corresponding to a person;
   generating, by the client component of the identity protector system, a pre-pseudonym (PI) based on the unique identifiers and a protected hash function;
   sending, by the client component of the identity protector system, the PI with the source identifier to the source computing system;
   erasing, by the client component of the identity protector system, the person-specific data from the client component of the identity protector system;
   receiving, by a master component of the identity protector system, the PI with the source identifier from the source computing system;
   generating, by the master component of the identity protector system, a pseudonym (PPI) based on the PI and the source ID, wherein generating the PPI is performed in response to a request for possible re-identification for a data record corresponding to the source identifier from the destination computing system; and
   transmitting, by the master component of the identity protector system, the PPI to the destination computing system; and
   storing, at a trusted database component of the identity protector system, an assignment of the PPI to the PI and the source ID to facilitate re-identification for the data record corresponding to the source identifier.

2. The method according to claim 1, further comprising:
   receiving, by the identity protector system, information from the destination computing system regarding conditions under which the destination computing system is permitted to receive psedonymized data in place of anonymized data.

3. The method according to claim 1, further comprising:
   providing, by a trust center component of the identity protector system, re-identification for the data record corresponding to the source identifier.

4. The method according to claim 3, wherein providing the re-identification comprises releasing the assignment of the PPI to the PI and the source ID from the trusted database component using a private key.

5. The method according to claim 4, wherein the private key comprises multiple partial keys distributed over multiple trust entities.

6. The method according to claim 1, wherein generating the PPI is further based on a time value and an erratic value.

7. An identity protector system for pseudonymizing digital data records for transmission from a source computing system to a destination computing system, the system comprising:
   a client component, configured to:
      receive person-specific data from a source computing system provided with a source identifier, wherein the person-specific data comprises unique identifiers corresponding to a person;
      generate a pre-pseudonym (PI) based on the unique identifiers and a protected hash function;
      send the PI with the source identifier to the source computing system; and
      erase the person-specific data from the client component of the identity protector system;
   a master component, configured to:
      receive the PI with the source identifier from the source computing system;
      generate a pseudonym (PPI) based on the PI and the source ID, in response to a request for possible re-identification for a data record corresponding to the source identifier from the destination computing system; and
      transmit the PPI to the destination computing system; and
   a trusted database component, configured to store an assignment of the PPI to the PI and the source ID, to facilitate re-identification for the data record corresponding to the source identifier.

8. The identity protector system according to claim 7, further comprising:
   a trust center component, configured to provide re-identification for the data record corresponding to the source identifier.

9. The identity protector system according to claim 8, wherein the re-identification includes releasing the assignment of the PPI to the PI and the source ID from the trusted database component using a private key.

10. The identity protector system according to claim 9, wherein the private key comprises multiple partial keys distributed over multiple trust entities.

11. The identity protector system according to claim 7, wherein generating the PPI is further based on a time value and an erratic value.

* * * * *